UNITED STATES PATENT OFFICE.

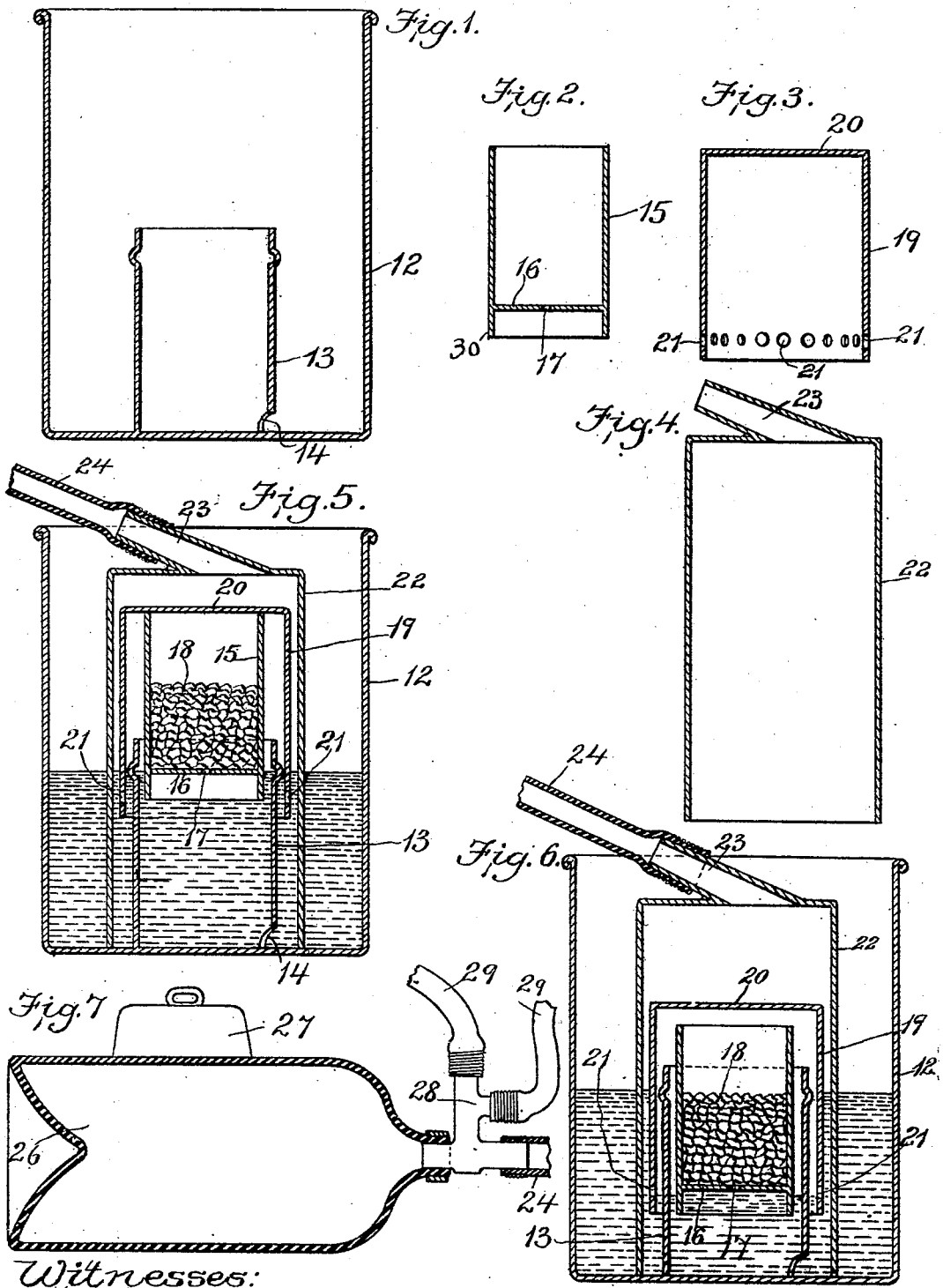
C. F. SPAULDING.
ACETYLENE GENERATOR.
APPLICATION FILED SEPT. 28, 1907.
960,051.  Patented May 31, 1910.

CHARLES F. SPAULDING, OF WALTHAM, MASSACHUSETTS.

ACETYLENE-GENERATOR.

960,051.  Specification of Letters Patent. Patented May 31, 1910.

Application filed September 28, 1907. Serial No. 394,945.

*To all whom it may concern:*

Be it known that I, CHARLES F. SPAULD-ING, of Waltham, in the county of Middlesex and State of Massachusetts, have invented certain new and useful Improvements in Acetylene-Generators, of which the following is a specification.

This invention has for its object first to provide a generator having a removable carbid holder, and adapted to continuously convert the contents of the holder into acetylene gas, and to store the same for use.

The invention also has for its object to provide improved means for washing or purifying the gas as fast as it is generated.

The invention also has for its object to provide means for preventing access of water to the contents of the carbid holder during the operation of assembling the parts of the generator, so that there will be no premature generation of gas before the apparatus is in working condition.

The invention consists in the several improvements which I will now proceed to describe and claim.

Of the accompanying drawings, forming a part of this specification,—Figure 1 represents a sectional view of the water tank or main holder of my improved apparatus. Fig. 2 represents a sectional view of the carbid holder. Fig. 3 represents a sectional view of the inner gas holder. Fig. 4 represents a sectional view of the outer gas holder. Fig. 5 represents a sectional view of the entire generator, including the parts shown in Figs. 1, 2, 3 and 4, in the relative positions they occupy before the generation of gas commences. Fig. 6 represents a view similar to Fig. 5, showing the said parts in the relative positions they occupy during the generation of gas. Fig. 7 represents a sectional view of a gas holder adapted for use as a part of the apparatus.

The same numerals of reference indicate the same parts in all the figures.

In the drawings 12 represents a water tank, which is preferably cylindrical, and may be made of any suitable material, such as galvanized sheet iron.

13 represents a guide affixed to the bottom of the tank 12, and rising from the central portion thereof, said guide being preferably tubular, and provided at its lower portion with one or more openings 14 which permit water to stand at the same level within the guide as in the surrounding portion of the tank.

15 represents a carbid holder, which is open at its top, and has a bottom 16 in which is formed a relatively small orifice 17 for the admission of water from the tank 12 to the carbid 18 in the holder. The holder 15 is adapted to enter the guide 13 loosely, and to rise and fall freely in the guide.

19 represents an inner inverted gas holder having a closed upper end or head 20, which at the commencement of the operation, rests on the open end or mouth of the carbid holder 15, the lower end of the inner gas holder 19 being immersed in the body of water in the tank 12 and sealed thereby. A series of orifices 21 are formed in the lower portion of the gas holder 19, these orifices permitting the escape of gas from the inner holder at points below the level of the water in the tank, the gas passing upwardly through the water, and being washed or purified thereby, as hereinafter explained. The inner gas holder 19 is formed to loosely surround the guide 13, and to move freely up and down upon it.

22 represents an outer gas holder, the open lower end of which is adapted to rest upon the bottom of the tank 12, the depth of the outer holder being such that its upper end or head is elevated considerably above the upper ends of the carbid holder and inner gas holder at the commencement of the operation, as shown in Fig. 5. The outer gas holder 22 has an outlet or nipple 23, with which a gas-conducting pipe 24, which may be flexible, is connected.

The operation of the above-described apparatus is as follows: A suitable quantity of water being placed in the tank 12, the carbid holder is first charged with carbid, and then inserted into the upper end of the guide 13, the bottom of the holder coming in contact with the water in the tank, and settling therein as fast as the water passes through the restricted orifice 17. The inner gas holder 20 is then placed in position over the carbid holder, and rests on the mouth thereof, as shown in Fig. 5. The outer gas holder is then placed in position, and incloses the inner gas holder and the carbid holder. The gas pipe 24 is then connected with the outer holder, and the operation of the apparatus commences. As fast as the water enters the carbid holder through the restricted orifice 17, the carbid holder sinks, the rate of its downward movement and of the generation of gas being determined by the size of the orifice 17. The gas thus generated, rises, and its pressure raises the head 20 of the inner gas holder from the mouth of the carbid holder, and presses the water within the lower portion of the inner gas holder downwardly to a point below the orifices 21. The gas passes upwardly through said orifices into the water surrounding the inner gas holder 19, this water being correspondingly raised by the depression of the water within the inner gas holder. The gas passes upwardly into the outer gas holder 22, and is washed and purified on its way by passage through the water surrounding the inner gas holder. From the outer gas holder, the gas passes through the pipe 24 to a suitable reservoir or holder, which may be of any suitable construction.

In Fig. 7 I show a gas reservoir 26, composed of a flexible rubber bag, which may rest on a suitable rigid support, and may have a weight 27 resting on its upper side. The gas pipe 24 is connected with the reservoir 26, the latter being provided with a suitable branch outlet 28, with which service pipes 29 may be connected. In a small and portable apparatus the service pipes 29 may be flexible, the apparatus here shown being particularly adapted for small summer cottages, camps, etc., where the apparatus may be quickly installed and as quickly removed. The flexible service pipes 29 may be temporarily supported by hooks or otherwise, and provided with suitable burners. My invention is not limited, however, to a small and portable apparatus, and may be embodied in an apparatus of any desired size and capacity. The gas reservoir may be of any other suitable construction, and may embody a fixed tank and a floating, inverted gas holder therein, with suitable means for conducting gas from the interior of the floating holder to the service pipes.

To prevent premature generation of gas and its escape before the parts of the generator have been assembled, the body of the carbid holder may be provided with a skirt or extension 30, projecting below the bottom 16, and forming an air trap adapted to confine a body of air when the holder is first introduced into water in the tank. The air thus confined, passes through the orifice 17 into the carbid before any water can pass through said orifice. Time is therefore afforded for the completion of the operation of assembling parts of the generator before the generation of gas commences.

I claim:

1. An acetylene generator comprising a water tank, a vertically movable carbid holder having an open top and a bottom provided with a restricted aperture for the slow admission of water to the interior of the holder, and a downwardly extending flange surrounding said bottom, the said holder being movable in the tank by gravitation, an inverted gas holder adapted to surround the carbid holder, the lower end of the gas holder being immersed in the water in the tank, and provided with gas outlets below the water line, whereby gas escaping through said outlets is forced to pass upwardly through water outside the holder, and means for accumulating gas outside the said holder.

2. An acetylene generator comprising a water tank having a guide rising from the central part of its bottom, a vertically movable carbid holder having an open top and a bottom provided with a restricted aperture for the slow admission of water to the interior of the said holder, and a downwardly extending flange surrounding said bottom, said holder being adapted to enter the guide and movable therein by gravitation, an inner inverted gas holder adapted to surround the guide, and form a gas chamber around the upper portion of the carbid holder, the lower end of said holder being immersed in the water contained in the tank, and provided with gas outlets, an outer inverted gas holder adapted to surround the inner holder and to rest on the bottom of the water tank, said outer holder having means for connection with a gas conduit.

3. An acetylene generator comprising a water tank, a vertically movable carbid holder movable therein by gravitation and having an open top and a bottom provided with a restricted aperture for the slow admission of water to the interior of the holder, the body of the tank being extended below said bottom to form an air trap, and means for accumulating gas above the carbid holder.

In testimony whereof I have affixed my signature, in presence of two witnesses.

CHARLES F. SPAULDING.

Witnesses:
ARTHUR H. BROWN,
P. W. PEZZETTI.